(12) United States Patent
Otake

(10) Patent No.: US 10,137,776 B2
(45) Date of Patent: Nov. 27, 2018

(54) VEHICLE TRAVELING CONTROL APPARATUS

(71) Applicant: TOYOTA JIDOSHA KABUSHIKI KAISHA, Toyota-shi (JP)

(72) Inventor: Hirotada Otake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/667,947

(22) Filed: Aug. 3, 2017

(65) Prior Publication Data

US 2018/0037112 A1 Feb. 8, 2018

(30) Foreign Application Priority Data

Aug. 4, 2016 (JP) .................. 2016-153873

(51) Int. Cl.
| | |
|---|---|
| *B60K 28/06* | (2006.01) |
| *B60W 10/04* | (2006.01) |
| *B60W 10/18* | (2012.01) |
| *B60W 30/09* | (2012.01) |
| *B60W 30/12* | (2006.01) |

(52) U.S. Cl.
CPC ............. *B60K 28/06* (2013.01); *B60W 10/04* (2013.01); *B60W 10/18* (2013.01); *B60W 30/09* (2013.01); *B60W 30/12* (2013.01); *B60W 2520/10* (2013.01); *B60W 2540/26* (2013.01); *B60W 2710/18* (2013.01); *B60W 2720/10* (2013.01)

(58) Field of Classification Search
CPC ....... B60K 28/06; B60W 10/04; B60W 10/18; B60W 30/09; B60W 30/12; B60W 2520/10; B60W 2540/26; B60W 2710/18; B60W 2720/10
USPC .................................................... 701/70, 301
See application file for complete search history.

(56) References Cited

U.S. PATENT DOCUMENTS

| | | | | |
|---|---|---|---|---|
| 2012/0101660 A1* | 4/2012 | Hattori | ................. | G05D 1/0022 701/2 |
| 2014/0121927 A1* | 5/2014 | Hanita | ..................... | B60T 7/14 701/70 |
| 2015/0061895 A1* | 3/2015 | Ricci | ...................... | H04W 4/90 340/902 |
| 2017/0232973 A1 | 8/2017 | Otake | | |
| 2018/0075747 A1* | 3/2018 | Pahwa | ................... | G08G 1/164 |

FOREIGN PATENT DOCUMENTS

JP          2015-54547        3/2015

* cited by examiner

*Primary Examiner* — Marthe Y Marc-Coleman
(74) *Attorney, Agent, or Firm* — Oblon, McClelland, Maier & Neustadt, L.L.P.

(57) ABSTRACT

A vehicle traveling control apparatus includes an abnormality monitoring device which determines whether or not a driver of a vehicle is in an abnormal state where the driver loses an ability to drive the vehicle, and a decelerating device which decelerates the vehicle to automatically stop the vehicle after a conclusive abnormality determination time point which is a time point when the abnormality monitoring device finalizes the determination that the driver is in the abnormal state. The decelerating device is configured to prohibit the deceleration of the vehicle when the vehicle is in the deceleration prohibition situation after the conclusive abnormality determination time point.

12 Claims, 6 Drawing Sheets

VEHICLE TRAVELING CONTROL APPARATUS

BACKGROUND OF THE INVENTION

1. Field of the Invention

The present invention relates to a vehicle traveling control apparatus which decelerates a vehicle to stop (automatically stop) the vehicle when a driver falls into an abnormal state in which the driver loses an ability to drive the vehicle.

2. Description of the Related Art

Conventionally, an apparatus has been proposed, which determines whether or not a driver falls into an abnormal state where the driver loses an ability to drive a vehicle (for example, a state in which the driver drives the vehicle while sleeping, a state in which a mind and body function of the driver stops, or the like), and performs a control which automatically stops the vehicle regardless of whether or not a brake operation is performed when the driver is determined to be in such an abnormal state (for example, refer to Japanese Patent Application Laid-Open (kokai) No. 2015-54547).

Hereinafter, such a vehicle which is automatically stopped is also referred to as an "automatically stopped vehicle."

SUMMARY OF THE INVENTION

However, according to the conventional apparatus, a situation where it is permitted to automatically stop the vehicle is not specifically specified/discussed. Therefore, a case may arise where the vehicle is automatically stopped when the vehicle is in a state that is not suitable (unfavorable) for stopping the vehicle automatically. That is, there is a possibility that the vehicle is automatically stopped when the vehicle is in at least one of the following situations.

A situation where a vehicle (i.e., another vehicle) other than the automatically stopped vehicle such as a following vehicle of the automatically stopped vehicle or the like needs to apply a sudden braking in order to avoid the automatically stopped vehicle, because the vehicle other than the automatically stopped vehicle is traveling at high speed.

A situation where a weather condition is not good (for example, in a rainfall or in a dense fog, or the like), and therefore, it is not easy for the driver of another vehicle to visually recognize the automatically stopped vehicle because the visibility for the driver is poor/deteriorated.

A situation where a road surface friction coefficient (road surface p) is small, and therefore, it is difficult for another vehicle such as the following vehicle of the automatically stopped vehicle to stably perform a sudden stop or a rapid deceleration in order to avoid the automatically stopped vehicle.

The present invention has been made in order to solve the above-mentioned problem. That is, one of objects of the present invention is to provide a vehicle traveling control apparatus (hereinafter also referred to as a "present invention apparatus") which decelerates a vehicle to stop the vehicle when a driver of the vehicle falls into the abnormal state in which the driver loses the ability to drive the vehicle, and which can reduce the possibility that the vehicle is stopped when the vehicle is in the situation that is not suitable/favorable for stopping the vehicle automatically.

The present invention apparatus which is a vehicle traveling control apparatus applied to a vehicle comprising;
   abnormality monitoring means (10, step 230, step 320) for monitoring whether or not a driver of the vehicle is in an abnormal state where the driver loses an ability to drive the vehicle; and
   decelerating means (10, 30, 31, 40, 41, step 550) for decelerating the vehicle to automatically stop the vehicle after a conclusive abnormality determination time point which is a time point when the abnormality monitoring means finalizes a determination that the driver is in the abnormal state,
wherein, the decelerating means is configured to:
   determine whether or not the vehicle is in a deceleration prohibition situation based on at least one set of self-vehicle information on a traveling state of the vehicle, information on a speed of another vehicle traveling around the vehicle, information on a speed limit of a road on which the vehicle is traveling, information on weather condition around the vehicle, and information on a road surface condition of the road on which the vehicle is traveling; and
   prohibit the deceleration of the vehicle (step 545) when it is determined that the vehicle is in the deceleration prohibition situation ("No" determination at step 540).

According to the present invention apparatus, the decelerating means decreases the vehicle speed of the vehicle to zero so as to stop the vehicle after the conclusive abnormality determination time point at which the abnormality monitoring means finalizes the determination that the driver is in the abnormal state. In this case, the deceleration of the vehicle is prohibited when it is determined by the decelerating means that the vehicle is in the deceleration prohibition situation based on at least one set of self-vehicle information on a traveling state of the vehicle, information on a speed of another vehicle traveling around the vehicle, information on a speed limit of a road on which the vehicle is traveling, information on weather condition around the vehicle, and information on a road surface condition of the road on which the vehicle is traveling. As a result, it is possible to reduce the possibility that the vehicle is stopped in the situation which is not suitable (favorable) for a situation where the vehicle is automatically stopped.

In one of the aspects of the present invention apparatus, the decelerating means is configured to:
   start the deceleration of the vehicle from a tentative abnormal determination time point which is a time point at which it is determined that the driver is likely to be in the abnormal state by the abnormality monitoring means and which is prior to the conclusive abnormal determination time point (step 440); and
   prohibit the deceleration of the vehicle (step 450) when it is determined that the vehicle is in the deceleration prohibition situation in a period after the tentative abnormality determination time point ("Yes" determination at step 410, and "No" determination at step 430).

According to this aspect, after the tentative abnormality determination time point, the deceleration of the vehicle is prohibited when it is determined that the vehicle is in the deceleration prohibition situation based on at least one set of the self-vehicle information on the traveling state of the vehicle, the information on the speed of another vehicle traveling around the vehicle, the information on the speed limit of the road on which the vehicle is traveling, the information on weather condition around the vehicle, and the information on the road surface condition of the road on which the vehicle is traveling. As a result, in the situation which is not suitable (favorable) for automatically stopping the vehicle, it is possible to further reduce the possibility that the vehicle is made to be stopped or the possibility that the vehicle is made to travel/run at an extremely low speed.

In one of the aspects of the present invention apparatus, the decelerating means is configured to:
acquire a vehicle speed of the vehicle as the self-vehicle information; and
determine whether or not the vehicle speed acquired as the self-vehicle information is higher than a threshold self-vehicle speed to determine whether or not the vehicle is in the deceleration prohibition situation (step 610).

When the vehicle speed of the self-vehicle exceeds the threshold self-vehicle speed, it is considered that the vehicle (vehicle whose driver is or is likely to be in the abnormal state) is traveling on a road on which vehicles are permitted to travel at high speed (for example, an expressway such as an autobahn or the like). Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with a cruise control apparatus (10) which controls a vehicle speed of the vehicle in such a manner that the vehicle speed of the vehicle becomes equal to a target vehicle speed set by the driver, and
the decelerating means is configured to acquire a vehicle speed of the vehicle and the target vehicle speed which has been set most recently as the self-vehicle information, and to determine whether or not the vehicle speed of the vehicle is higher than the target vehicle speed which has been set most recently, to determine whether or not the vehicle is in the deceleration prohibition situation (step 610).

When the vehicle speed is higher than the target vehicle speed set most recently for the cruise control apparatus, for example, a case where the driver depresses the accelerator to drive the vehicle at a vehicle speed higher than the target vehicle speed (in the case of accelerator override), and the like are conceivable. In such a case, it is considered that the vehicle (vehicle whose driver is or is likely to be in the abnormal state) is traveling on a road area (a passing lane or the like) where traveling at high speed is necessary. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the decelerating means is configured to determine whether or not the vehicle speed of another vehicle is higher than a threshold another vehicle speed to determine whether or not the vehicle is in the deceleration prohibition situation (step 610).

When the vehicle speed of another vehicle is higher than the threshold another vehicle speed, a case where the vehicle (vehicle whose driver is or is likely to be in the abnormal state) is traveling on the road (for example, the expressway or the like such as the autobahn) on which vehicles are permitted to travel at high speed is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with a cruise control apparatus (10) which controls a vehicle speed of the vehicle in such a manner that the vehicle speed of the vehicle becomes equal to a target vehicle speed set by the driver, and
the decelerating means is configured to acquire the target vehicle speed as the information on the speed limit, and to determine whether or not the target vehicle speed is higher than a threshold target vehicle speed, to determine whether or not the vehicle is in the deceleration prohibition situation (step 610).

When the target vehicle speed of the vehicle set in the cruise control apparatus is higher than the threshold target vehicle speed, a case where the vehicle (vehicle whose driver is or is likely to be in the abnormal state) is traveling on the road (for example, the expressway or the like such as the autobahn) on which vehicles are permitted to travel at high speed is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with a navigation device having information on the speed limit of the road on which the vehicle is traveling, and
the decelerating means is configured to acquire the speed limit as the information on the speed limit from the navigation device, and to determine whether or not the acquired speed limit is higher than a threshold speed limit, to determine whether or not the vehicle is in the deceleration prohibition situation (step 610).

When the speed limit of the road on which the vehicle is traveling acquired from the navigation device is higher than the threshold speed limit, a case where the vehicle (vehicle whose driver is or is likely to be in the abnormal state) is traveling on the road (for example, the expressway or the like such as the autobahn) on which vehicles are permitted to travel at high speed is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with a communication device (111) configured to be capable of receiving information on the speed limit of the road on which the vehicle is traveling from an external device of the vehicle, and the decelerating means is configured to acquire the speed limit as the information on the speed limit from the communication device, and to determine whether or not the acquired speed limit is higher than a threshold speed limit, to determine whether or not the vehicle is in the deceleration prohibition situation (step 610).

When the speed limit of the road on which the vehicle is traveling acquired from the external device is higher than the threshold speed limit, a case where the vehicle (vehicle whose driver is or is likely to be in the abnormal state) is traveling on the road (for example, the expressway or the like such as the autobahn) on which vehicles are permitted to travel at high speed is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with an imaging device (17b) which acquires image data by photographing a peripheral region of the vehicle, and the decelerating means is configured to extract the speed limit indicated by a road sign included in the image data as the information on the speed limit, and to determine whether or not the extracted speed limit is higher than a threshold speed limit, to determine whether or not the vehicle is in the deceleration prohibition situation (step 610).

When the speed limit indicated by the marker extracted from the image data captured by the imaging device is higher than the threshold speed limit, a case where the vehicle (vehicle whose driver is or is likely to be in the abnormal state) is traveling on the road (for example, the expressway or the like such as the autobahn) on which vehicles are permitted to travel at high speed is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with a rainfall information acquiring device (21, 111) which acquires rainfall information indicating whether or not the weather condition around the vehicle is rainy, and the decelerating means is configured to determine whether or not the weather condition around the vehicle is rainy based on the rainfall information, to determine whether or not the vehicle is in the deceleration prohibition situation (step 610).

When it is decided the weather condition around the vehicle (vehicle whose driver is or is likely to be in the abnormal state) is during rainfall based on the rainfall information, a case where the vehicle is traveling on the road where the surrounding weather conditions are during rainfall is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with a dense fog information acquiring device (111, 17b) which acquires dense fog information indicating whether or not the weather condition around the vehicle is densely foggy (step 610), and the decelerating means is configured to determine whether or not the weather condition around the vehicle is densely foggy based on the dense fog information, to determine whether or not the vehicle is in the deceleration prohibition situation (step 610).

When it is decided that the weather condition around the vehicle (vehicle whose driver is or is likely to be in the abnormal state) is during the dense fog occurrence based on the dense fog information, a case where the vehicle is traveling on the road where the surrounding weather conditions are during the dense fog occurrence is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In one of the aspects of the present invention apparatus, the vehicle is provided with a road surface $\mu$ acquiring device (101, 102, 111) which acquires a road surface friction coefficient of the road on which the vehicle is traveling, and the decelerating means is configured to acquire the road surface friction coefficient as the information on the road surface condition of the road on which the vehicle is traveling from road surface $\mu$ acquiring device, and to determine whether or not the road surface friction coefficient is smaller than a threshold road surface friction coefficient, to determine whether or not the vehicle is in the deceleration prohibition situation (step 610).

When the road surface friction coefficient is smaller than the threshold road surface friction coefficient, a case where the vehicle (vehicle whose driver is or is likely to be in the abnormal state) is traveling on the road surface having the low road friction coefficient is conceivable. Therefore, in this case, if the vehicle is decelerated, the vehicle is likely to interfere with the traffic of another vehicle, and accordingly, it is considered that the vehicle is in the situation (deceleration prohibition situation) where it is not preferable for the vehicle to be automatically stopped by the deceleration. In view of the above, according to the above aspect, the deceleration of the vehicle is prohibited in such a case. As a result, it is possible to further reduce the possibility that the vehicle is stopped or the vehicle travels at the extremely low speed in the situation which is not suitable (favorable) for automatically stopping the vehicle.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE PREFERRED EMBODIMENT

Figure 1:
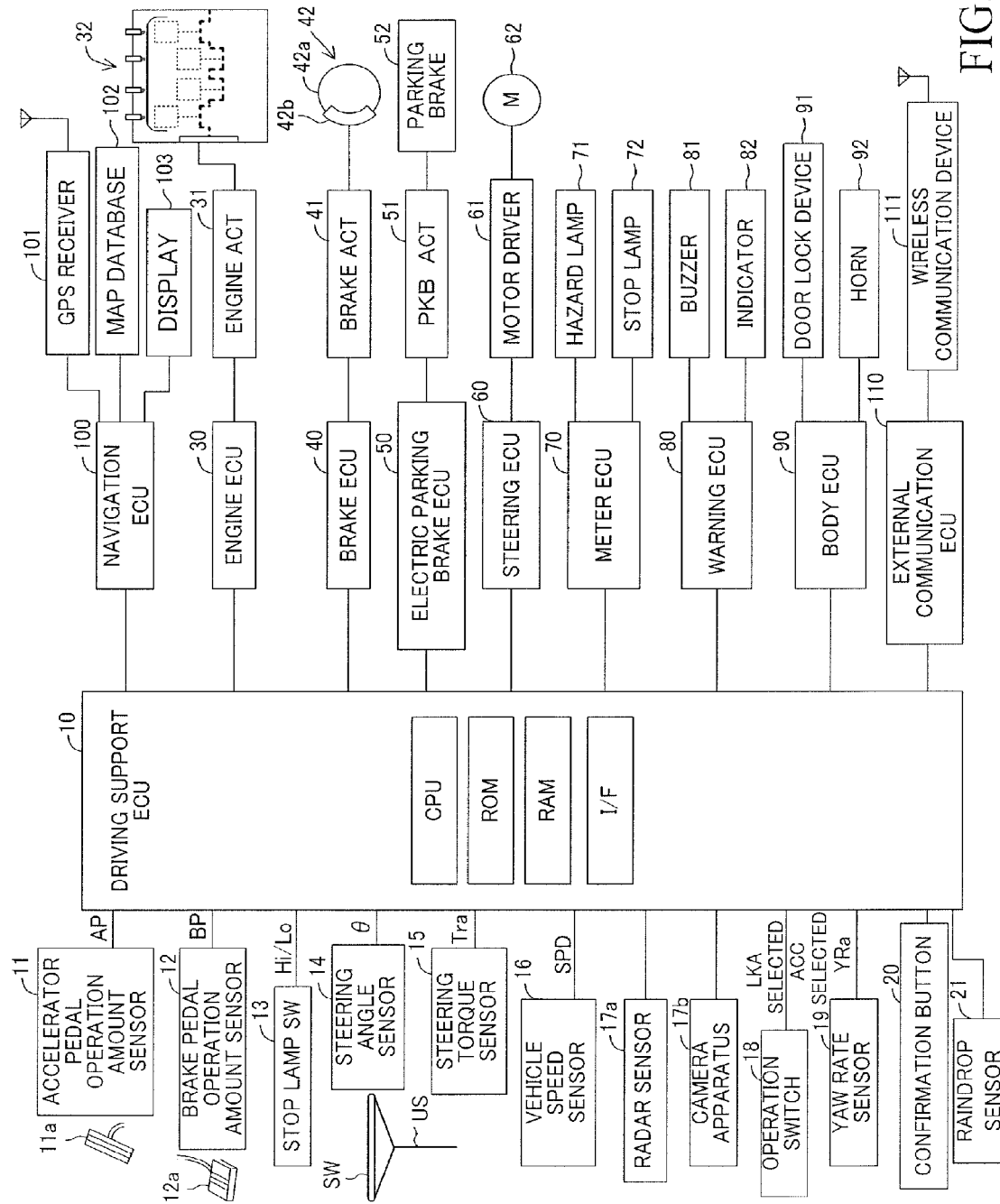
FIG. 1 is a schematic diagram of a vehicle traveling control apparatus according to an embodiment of the present invention.

A vehicle traveling control apparatus (driving support apparatus) according to an embodiment of the present invention will be described below, referring to figures.
<Construction>
The vehicle traveling control apparatus according to the embodiment of the present invention is, as shown in FIG. 1, applied to a vehicle (hereinafter, referred to as an self-vehicle (or own-vehicle)" in order to be distinguished from another vehicle), and, comprises a driving support ECU 10, an engine ECU 30, a brake ECU 40, an electric parking brake ECU 50, a steering ECU 60, a meter ECU 70, a warning ECU 80, a body ECU 90, a navigation ECU 100, and an external communication ECU 110.

Each of these ECUs is an electronic control unit comprising a microcomputer as a main part. The ECUs are connected with each other via CAN (Controller Area Network) which is not illustrated so that they are capable of mutually transmitting and receiving information. In the present specification, the microcomputer includes a CPU, a ROM, a RAM, a non-volatile memory, an interface I/F, and the like. The CPU is configured to implement various functions by executing instructions (programs, routines) stored in the ROM. Some or all of these ECUs may be integrated into a single ECU.

The driving support ECU 10 is connected to sensors (includes switches) described below, and is configured to receive a detection signal or an output signal of each of the sensors. It should be noted that each of the sensors may be connected to one of the ECUs other than the driving support ECU 10. In this case, the driving support ECU 10 receives the detection signal or the output signal of the sensor via CAN from the ECU to which the sensor is connected.

An accelerator pedal operation amount sensor 11 is configured to detect an operation amount of an accelerator pedal 11a (an accelerator position) of the self-vehicle, and to output a signal representing an accelerator pedal operation amount AP.

A brake pedal operation amount sensor 12 is configured to detect an operation amount of a brake pedal 12a of the self-vehicle, and to output a signal representing a brake pedal operation amount BP.

A stop lamp switch 13 is configured to output a low level signal when the brake pedal 12a is not being depressed (is not being operated), and to output a high level signal when the brake pedal 12a is being depressed (is being operated).

A steering angle sensor 14 is configured to detect a steering angle of the self-vehicle, and to output a signal representing a steering angle θ.

A steering torque sensor 15 is configured to detect a steering torque applied to a steering shaft US of the self-vehicle by an operation of a steering wheel SW, and to output a signal representing a steering torque Tra.

A vehicle speed sensor 16 is configured to detect a traveling speed (a vehicle speed) of the self-vehicle, and to output a signal representing a vehicle speed SPD.

A radar sensor 17a is configured to acquire information on a road in front of the self-vehicle and three-dimensional objects existing on the road. The three-dimensional objects represent moving objects such as pedestrians, bicycles and automobiles, and stationary objects such as utility poles, trees and guardrails. Hereinafter, these three-dimensional objects may be referred to as a "target object" in some cases.

The radar sensor 17a includes "a radar transmitting/receiving part and a signal processing part" which are not shown in the figure.

The radar transmitting/receiving part emits an electric wave in a millimeter waveband (hereinafter, referred to as a "millimeter wave") to an ambient region of the self-vehicle including a front region of the self-vehicle, and receives the millimeter wave (that is, a reflected wave) reflected from the target object existing within the emitted area.

The signal processing part acquires, every time a predetermined period of time elapses, an inter-vehicle gap (a longitudinal distance), a relative speed (a relative longitudinal speed), a lateral distance, a relative lateral speed, and the like, with respect to each detected target object based on a phase difference between the transmitted millimeter wave and the received reflected wave, an attenuation level of the reflected wave, a time from a point in time of transmitting the millimeter wave to a point in time of receiving the reflected wave, and the like. Further, the signal processing part acquires a speed of each target object (a vehicle speed of another vehicle) from the relative speed.

A camera apparatus 17b includes "a stereo camera and an image processing part" which are not shown in the figure. The camera apparatus 17b is also referred as an imaging device. The stereo camera acquires a left-and-right pair of image data by photographing the landscape of a left side region and a right region in the front of the vehicle (for example, the range from several meters to 50 meters from the front end of the vehicle). The image processing part is configured to calculate whether or not there is a target object, a relative relationship between the self-vehicle and the target object, or the like, based on the photographed left-and-right pair of image data to output them. Further, the image processing part detects and outputs "the number of lane markings, a line type of each lane marking, and a color of each lane marking" based on the image data.

It should be noted that the driving support ECU 10 is configured to determine a relative relationship (target object information) between the self-vehicle and the target object, by synthesizing "the relative relationship between the self-vehicle and the target object acquired by the radar sensor 17a" and "the relative relationship between the self-vehicle and the target object acquired by the camera apparatus 17b."

Further, the driving support ECU 10 is configured to detect a road sign (specifically, a limit speed indicator) from the image data photographed by the camera apparatus 17b to acquire its contents (information on the speed limit (referred to as "speed limit information").

Further, the driving support ECU 10 is configured to acquire the image data photographed by the camera apparatus 17b and analyzes the image to determine whether or not the weather is densely foggy. That is, the driving support ECU 10 together with the camera apparatus 17b constitutes a dense fog information acquiring apparatus that acquires dense fog information indicating whether a weather situation around the vehicle is a situation where a dense fog is occurring.

Further, the driving support ECU 10 is configured to also acquire information on whether or not a roadside wall exists, based on the image data photographed by the camera apparatus 17b.

An operation switch 18 is a switch to be operated by the driver. The driver can select whether or not a traffic lane keeping assist control (LKA: Lane Keeping Assist control) is performed by operating the operation switch 18. Further, the driver can select whether or not a trailing-travel inter-vehicle-distance control (ACC: Adaptive Cruise Control) is performed by operating the operation switch 18. Further, the driver can seta target vehicle speed.

A yaw rate sensor 19 is configured to detect a yaw rate of the self-vehicle to output an actual yaw rate YRa.

A confirmation button 20 is disposed at a position that can be operated by the driver, outputs a low level signal when it is not operated, and outputs a high level signal when it is pressed. The confirmation button 20 is disposed at a position at which the driver can operate the confirmation button 20, and outputs a low level signal when it is not operated/pressed, and outputs a high level signal when it is operated/pressed.

A raindrop sensor 21 is disposed outside the window glass of the self-vehicle, and detects an amount of raindrops to output the detection result.

The driving support ECU 10 is configured to be able to perform the LKA and the ACC. Further, the driving support ECU 10 is configured to monitor (determine) whether or not the driver is in an abnormal state in which the driver loses the ability to drive the vehicle, and to perform various controls for performing appropriate processes when it is determined that the driver is in the abnormal state.

<The Traffic Lane Keeping Control (LKA)>

The traffic lane keeping control is a control to support a steering operation of the driver by applying a steering torque to the steering mechanism so that a position of the self-vehicle is kept in the vicinity of a target traveling line in a "lane (traveling lane) on which the self-vehicle is traveling." The traffic lane keeping control itself is well-known (for example, refer to Japanese Patent Applications Laid-Open (kokai) No. 2008-195402, No. 2009-190464, No. 2010-6279, and Japanese Patent No. 4349210, etc.).

More specifically, the driving support ECU 10 recognizes (acquires) "the left white line LL and the right white line LR" of the lane on which the self-vehicle is traveling based on the image data transmitted from the camera apparatus 17b, and determines a central position of a pair of these white lines to be (as) the target traveling line Ld. Moreover, the driving support ECU 10 calculates a curve radius (a radius of curvature) R of the target traveling line Ld, and "a position and a direction" of the self-vehicle within the traveling lane defined by the left white line LL and the right white line LR.

The driving support ECU 10 calculates a distance Dc (hereinafter, referred to as a "center distance Dc") in a width direction of a road between a central position of a front end of the self-vehicle and the target traveling line Ld, and calculates a deviation angle θy (hereinafter, referred to as a "yaw angle θy") between a direction of the target traveling line Ld and a traveling direction of the self-vehicle.

Further, the driving support ECU 10 calculates a target yaw rate YRc* from a following formula (1) based on the center distance Dc, the yaw angle θy, and a road curvature v (=1/R) at a predetermined calculation interval. In the formula (1), K1, K2 and K3 are control gains. The target yaw rate YRc* is a yaw rate which is set in such a manner that the self-vehicle can travel along the target traveling line Ld.

$$YRc^* = K1 \times Dc + K2 \times \theta y + K3 \times v \tag{1}$$

The driving support ECU 10 calculates a target steering torque Tr* for realizing/acquiring the target yaw rate YRc* based on the target yaw rate YRc* and the actual yaw rate YRa at a predetermined calculation interval. More specifically, the driving support ECU 10 stores a lookup table in advance which defines a relationship between a "deviation between the target yaw rate YRc* and the actual yaw rate YRa" and a "target steering torque Tr*", and calculates the target steering torque Tr* by applying the deviation between the target yaw rate YRc* and the actual yaw rate YRa to this table. Thereafter, the driving support ECU 10 controls a steering motor 62 using the steering ECU 60 in such a manner that the actual steering torque Tra becomes equal to the target steering torque Tr*. The above description is an outline of the traffic lane keeping control.

<Trailing Inter-Vehicle Distance Control (ACC)>

The trailing inter-vehicle distance control is a control to make the self-vehicle trail the preceding vehicle traveling right ahead the self-vehicle, while keeping the inter-vehicle distance between the preceding vehicle and the self-vehicle to be/at a predetermined distance. The trailing inter-vehicle distance control itself is well known (for example, refer to Japanese Patent Applications Laid-Open (kokai) No. 2014-148293 and No. 2006-315491, and Japanese Patents No.

4172434, and No. 4929777 and so on.) Therefore, a simple description will be made below.

The driving support ECU 10 performs the trailing inter-vehicle distance control in a case when the trailing inter-vehicle distance control is being requested by the operation of the operation switch 18.

More specifically, the driving support ECU 10 selects a trailing target vehicle (i.e., a trailing objective vehicle) based on the target object information acquired by the ambient sensor (the radar sensor 17a and the camera apparatus 17b) in a case when the trailing inter-vehicle distance control is being requested. For example, the driving support ECU 10 determines whether or not a relative position of the target object (n) identified by the lateral distance Dfy(n) and the inter-vehicle distance Dfx(n) of the detected target object (n) exists (or, is present) in a trailing target vehicle area which is set in advance. The trailing target vehicle area has a lateral length that becomes smaller as the inter-vehicle distance becomes larger. Thereafter, when the relative position of the target object exists (or, is present) in the trailing target vehicle area for more than or equal to a predetermined time, the driving support ECU 10 selects the target object (n) as the trailing target vehicle.

Further, the driving support ECU 10 calculates a target acceleration Gtgt using either a formula (2) or a formula (3) below. In the formula (2) and the formula (3), a Vfx(a) is a relative speed of the trailing target vehicle (a), k1 and k2 are predetermined positive gains (coefficients), and ΔD1 is an inter-vehicle deviation acquired by subtracting a "target inter-vehicle distance Dtgt" from an "inter-vehicle distance Dfx(a) of the trailing target vehicle (a)" (ΔD1=Dfx(a)−Dtgt). It should be noted that the target inter-vehicle distance Dtgt is calculated by multiplying a target inter-vehicle time Ttgt which is set by the driver by using the operation switch 18 by the vehicle speed SPD of the self-vehicle (Dtgt=Ttgt× SPD).

The driving support ECU 10 determines the target acceleration Gtgt by using (in accordance with) the following formula (2) in a case when the value (k1×ΔD1+k2×Vfx(a)) is positive or "0." Ka1 is a positive gain (coefficient) for an acceleration and is set to be a value less than or equal to be "1."

$$Gtgt(\text{for the acceleration})=ka1\times(k1\times\Delta D1+k2\times Vfx(a)) \quad (2)$$

On the other hand, the driving support ECU 10 determines the target acceleration Gtgt by using (in accordance with) the following formula (3) in a case when the value (k1×ΔD1+k2×Vfx(a)) is negative. Kd1 is positive a gain (coefficient) for a deceleration and is set to be "1" in the present embodiment.

$$Gtgt(\text{for the deceleration})=kd1\times(k1\times\Delta D1+k2\times Vfx(a)) \quad (3)$$

It should be noted that in a case when the target object does not exist (or not be present) in the trailing target vehicle area, the driving support ECU 10 determines the target acceleration Gtgt based on a "target vehicle speed SPDtgt (hereinafter referred to as a "set vehicle speed or set vehicle speed of ACC") which is set depending on the target inter-vehicle time Ttgt and the vehicle speed SPD, in such a manner that the vehicle speed SPD of the self-vehicle matches with (becomes equal to) the target vehicle speed SPDtgt. The target vehicle speed is set by the driver. The driving support ECU is configured to be able to set the target vehicle speed SPDtgt to a desired vehicle speed based on the operation of the operation switch 18 by the driver.

The driving support ECU 10 controls the engine actuator 31 through the engine ECU 30, and when needed, controls the brake actuator 41 through the brake ECU 40 in such a manner that the acceleration of the vehicle matches with the target acceleration Gtgt. The above description is an outline of the trailing Inter-vehicle distance Control.

The engine ECU 30 is connected to an engine actuator 31. The engine actuator 31 includes actuators for changing a driving state of an internal combustion engine 32. In the present embodiment, the internal combustion engine 32 is a gasoline fuel injection, spark ignition, multi-cylinder engine, and comprises a throttle valve to adjust an intake air amount. The engine actuator 31 includes at least a throttle valve actuator to change an opening degree of the throttle valve. The engine ECU 30 can change torque which the internal combustion engine 32 generates by driving the engine actuator 31. The torque which the internal combustion engine 32 generates is transmitted to a non-illustrated driving wheels via a non-illustrated transmission gear. Therefore, the engine ECU 30 can control the engine actuator 31 to control a driving force of the self-vehicle, so as to change an acceleration state (an acceleration).

The brake ECU 40 is connected to a brake actuator 41. The brake actuator 41 is provided at a hydraulic circuit between a non-illustrated master cylinder to compress operating fluid with a depression force of the brake pedal and friction brake mechanisms 42 provided at left-and-right-front wheels and left-and-right-rear wheels. The friction brake mechanisms 42 comprises a brake disc 42a fixed to the wheel and a brake caliper 42b fixed to a vehicle body. The brake actuator 41 adjusts, in response to an instruction from the brake ECU 40, a hydraulic pressure of the operating fluid that is supplied to a wheel cylinder which is built in the brake caliper 42b, and operates the wheel cylinder with the hydraulic pressure. Thereby, the brake actuator 41 presses a brake pad onto the brake disc 42a to generate a friction brake force. Accordingly, the brake ECU 40 can control the brake force of the self-vehicle by controlling the brake actuator 41.

The electric parking brake ECU (hereinafter, may be referred to as an "EPB ECU") 50 is connected to a parking brake actuator (hereinafter, may be referred to as a "PKB actuator") 51. The parking brake actuator 51 is an actuator for pressing the brake pad onto the brake disc 42a or for, in a case when comprising a drum brake, pressing a shoe on a drum rotating with the wheel. Therefore, the EPB ECU 40 can apply a parking brake force to the wheels by means of the PKB actuator 51 to maintain the vehicle in a stop state.

The steering ECU 60 is a control apparatus of a well-known electrically-driven power steering system and is connected to a motor driver 61. The motor driver 61 is connected to the steering motor (turning use motor) 62. The steering motor 62 is incorporated into a non-illustrated "steering mechanism including the steering wheel, the steering shaft coupled to the steering wheel, a gear mechanism for steering, and the like" of the vehicle. The steering motor 62 generates torque with electric power supplied from the motor driver 61 to be able to add a steering assist torque using the torque, or to turn steered wheels in the left-and-right direction.

The meter ECU 70 is connected to a non-illustrated digital indication type meter and is also connected to a hazard lamp 71 and a stop lamp 72. The meter ECU 70 can, in response to an instruction from the driving support ECU 10, make the hazard lamp 71 flash/blink and make the stop lamp 72 light.

The warning ECU 80 is connected to a buzzer 81 and an indicator 82. The warning ECU 80 can, in response to an instruction from the driving support ECU 10, make the buzzer 81 sound to alert the driver, make a mark for alerting (for example, a warning lamp) light on the indicator 82, and display an operating state of a driving support control on the indicator 82.

The body ECU 90 is connected to a door lock device 91 and a horn 92. The body ECU 90 can release the door lock device 91 in response to an instruction from the driving support ECU 10. Furthermore, the body ECU 90 can sound the horn 92 in response to an instruction from the driving support ECU 10.

The navigation ECU 100 is connected to a GPS receiver 101 that receives GPS signals for detecting a position of the self-vehicle, a map database 102 that is storing map information etc, a touch panel display 103 that is a human machine interface, and the like. The navigation ECU 100 identifies the present position (when the self-vehicle is traveling on a road having a plurality of lanes (lanes), it includes information for identifying which lane the vehicle is traveling on.) of the self-vehicle based on the GPS signals. The navigation ECU 100 performs various arithmetic processing based on the position of the self-vehicle and the map information stored in the map database 102, and performs a route guidance using the display 103.

The map information stored in the map database 102 includes road information. The road information includes Information on the speed limit of the road.

The external communication ECU 110 is connected to a wireless communication device 111. The external communication ECU 110 and the wireless communication device 111 are wireless communication terminals for wirelessly connecting the self-vehicle to an external network system. Further, the wireless communication device 111 can wirelessly communicate with a communication device (hereinafter also referred to as a "roadside device") installed on the road. The roadside device is configured to be able to communicate with a traffic center and a weather center, and to acquire weather information, information on the speed limit, and information on road surface friction coefficient on the place where the roadside device is located from these centers, and to transmit them to the vehicle. It should be noted that the weather information includes rainfall information of the place where the roadside device is located, and dense fog information of the place where the roadside device is located.

(Outline of Operation)

Next, an outline of an operation of the driving support ECU 10 will be described. The driving support ECU 10 monitors (repeatedly makes a decision) whether or not the driver of the self-vehicle is in an "abnormal state (simply referred to as an "abnormal state") where the driver loses an ability to drive the self-vehicle" when the driver is driving the self-vehicle. The driving support ECU 10 classifies a present state of the driver into three stages/states, namely, a "normal state", a "tentative abnormal state", and a "conclusive abnormal state" to perform processes according to each of the stages/states.

More specifically, in a situation where the driving support ECU 10 decides that the driver is in the normal state, the driving support ECU 10 determines that it is likely that the driver is in (has fallen into) the abnormal state when a "state in which it can be regarded that there is no driving operation" has continued for a tentative abnormality confirmation time t1ref. That is, the driving support ECU 10 determines that the driver has fallen into the tentative abnormal state. It should be noted that, the state in which it can be regarded that there is no driving operation is one of the states that occur when the driver is in the abnormal state, and is also referred to as a "no driving operation state." The no driving operation state is a state in which all of the following conditions 1 to 3 are satisfied.

(Condition 1) The steering torque Tra detected by the steering torque sensor 15 is "0."

(Condition 2) The accelerator pedal operation amount AP detected by the accelerator pedal operation amount sensor 11 has not changed.

(Condition 3) The brake pedal operation amount BP detected by the brake pedal operation amount sensor 12 has not changed.

It should be noted that the driving support ECU 10 may regard a state where one or two of the conditions 1 to 3 is/are satisfied as the no driving operation state. Furthermore, the following condition 4 may be added to them.

(Condition 4) The driving ECU 10 determines that the driver does not touch/hold the steering wheel SW based on information detected by a touch sensor (not shown) provided to the steering wheel SW.

In this case, a state in which the "condition 4" or "one or more of the conditions 1 to 3 in addition to the condition 4" is/are satisfied may be regarded as the no driving operation state.

When the driving support ECU 10 determines that the state of the driver is the "tentative abnormal state" (that is, when a tentative abnormality determination is made), it gives a warning to the driver for prompting/urging the driver to perform the driving operation, and forcibly decelerates the vehicle down to a predetermined speed (conclusive abnormality determination permission vehicle speed SPD1) at a constant deceleration (first deceleration $\alpha 1$).

Further, the driving support ECU 10 starts the traffic lane keeping control (LKA: lane keeping assist control) when the traffic lane keeping control is not being performed.

When the driver notices the warning or the deceleration of the vehicle, and thereby, the driver resumes the driving operation, the driving support ECU 10 detects the driving operation of the driver so as to determine that the state of the driver is the "normal state." In this case, the warning to the driver and the deceleration of the self-vehicle, which have been performed by that time point, are ended/stopped. Further, the setting state of the traffic lane keeping control is returned to the original setting state.

On the other hand, since the warning and the deceleration of the vehicle are performed after the time point (tentative abnormal state determination time point) when the state of the driver is determined to be the "tentative abnormal state", if the driver is not in the abnormal state, it is considered that the driver is likely to perform some kind of driving operation. Therefore, when the "state (no driving operation state) in which the driver does not perform any driving operation" continues over a conclusive abnormality determination time t2ref from the tentative abnormality determination time point, the probability that the driver is in the abnormal state is very high. In view of the above, in this case, the driving support ECU 10 confirms/finalizes the determination that the driver is in the abnormal state. In other words, the driving support ECU 10 determines that the driver is in the conclusive abnormal state (that is, it makes the "conclusive abnormality determination") to forcibly decelerate the vehicle at a constant deceleration (second deceleration $\alpha 2$) from that time point (time point of the conclusive abnormality determination) until the vehicle stops.

Meanwhile, in a situation (hereinafter referred to as a "deceleration prohibition situation") where the self-vehicle is in at least one of the following situations 1, 2, and 3, it is not preferable that the self-vehicle stop or travel at low speed, in view of the safety.

The situation 1: a situation where a vehicle (different vehicle) other than the self-vehicle such as a following vehicle of the automatically stopped self-vehicle or the like may need/require a sudden braking in order to avoid the automatically stopped self-vehicle because the vehicle other than the self-vehicle is traveling at high speed.

The situation 2: a situation where it is not easy for the driver of the different vehicle to visually recognize the automatically stopped self-vehicle because of the poor visibility for the driver of the different vehicle (for example, a raining condition (specifically, a slightly heavy rain or heavier rain), a dense fog condition, or the like). It should be noted that the "slightly heavy or heavier rain" means, for example, the "rain whose amount of rainfall per hour is 10 mm/h or more".

The situation 3: a situation where it is difficult for the different vehicle such as the following vehicle of the automatically stopped self-vehicle or the like to stably stop or stably rapidly-decelerate in order to avoid the automatically stopped self-vehicle, due to a low road surface friction coefficient (road surface μ).

Therefore, when it is determined that the state of the driver of the self-vehicle is the "tentative abnormal state" or the "conclusive abnormal state", the driving support ECU 10 determines whether or not the self-vehicle is in the deceleration prohibition situation. That is, the driving support ECU 10 determines whether or not the self-vehicle is in the deceleration prohibition situation, based on at least one of situations, conditions, and information described below. They are as follows:

Self-Vehicle information on the traveling state of the self-vehicle (more specifically, the vehicle speed of the self-vehicle, and the set vehicle speed of ACC which has been set most recently);

A Vehicle speed situation of another/different vehicle(s) traveling around the self-vehicle (specifically, information on the speed of another/different vehicle(s) traveling around the self-vehicle or on a speed limit of the road on which the self-vehicle is traveling); and A weather condition around the self-vehicle, and a road surface condition of the road on which the self-vehicle is traveling.

The driving support ECU 10 determines whether or not the self-vehicle is in the deceleration prohibition situation (that is, at least one of the situations 1 to 3 described above) based on information on the surrounding environment of the self-vehicle acquired using the various sensors, the imaging device and communication means such as the navigation devices or the like mounted on the self-vehicle. Specifically, the driving support ECU 10 makes the above determination according to determination methods shown in the Table 1 below.

TABLE 1

| | Deceleration prohibition situation | Determination method used by the driving support ECU | Situation of the self-vehicle |
|---|---|---|---|
| Situation 1 | Acquire the "vehicle speed of the self-vehicle" | When the "vehicle speed of the self-vehicle" exceeds a threshold vehicle speed of the self-vehicle, the driving support ECU determines that the self-vehicle is in the situation 1. | Since the self-vehicle is in a state of high speed traveling, there is a high possibility that the self-vehicle is in a place where another vehicle is traveling at high speed and is not easy to stop. |

TABLE 1-continued

| | Deceleration prohibition situation | Determination method used by the driving support ECU | Situation of the self-vehicle |
|---|---|---|---|
| | Acquire the "vehicle speed of the self-vehicle" and the "set vehicle speed (target vehicle speed) of ACC which has been set most recently" | When the "vehicle speed of the self-vehicle" exceeds the "set vehicle speed (target vehicle speed) of ACC which has been set most recently", the driving support ECU determines that the self-vehicle is in the situation 1. | Since the self-vehicle is traveling at high speed due to an over speed condition caused by an accelerator override in the ACC or by a temporary stop of execution of the ACC, etc., the self-vehicle is likely to be in a place where another vehicle is traveling at high speed, and thus, is not easy to stop. |
| | Acquire the "set vehicle speed of ACC (target vehicle speed)" | When the "set vehicle speed of ACC" exceeds a threshold target vehicle speed, the driving support ECU determines that the self-vehicle is in the situation 1. | The self-vehicle is likely to be in a place where another vehicle is traveling at high speed, and thus, is not easy to stop. |
| | Acquire a "vehicle speed of another vehicle around the self-vehicle (vehicle speed of a peripheral vehicle)" | When the "vehicle speed of the peripheral vehicle" exceeds a threshold vehicle speed of another vehicle, the driving support ECU determines that the self-vehicle is in the situation 1 | The self-vehicle is likely to be in a place where another vehicle is traveling at high speed, and thus, is not easy to stop. |
| | Acquire a "speed limit" from the navigation ECU or from the photographed image data including a road sign | When the "speed limit" exceeds a threshold speed limit, the driving support ECU determines that the self-vehicle is in the situation 1. | The self-vehicle is likely to be in a place where another vehicle is traveling at high speed, and thus, is not easy to stop. |
| Situation 2 | Acquire an "amount of rainfall/raindrop (rainfall information)" | When the "amount of rainfall" exceeds a threshold rainfall amount, the driving support ECU determines that the self-vehicle is in the situation 2. | The self-vehicle is likely to be in a place where the weather condition around the self-vehicle is rainy. |
| | Acquire "rainfall information" from the navigation ECU or from an external communication ECU. | When the rainfall information indicates that it is raining, the driving support ECU determines that the self-vehicle is in the situation 2. | The self-vehicle is likely to be in a place where the weather condition around the self-vehicle is rainy. |
| | Acquire the photographed image data (dense fog information) | When the driving support ECU determines that the self-vehicle is in a place where the weather condition of the surroundings is a dense fog through analyzing the "photographed image data", the driving support ECU determines that the self-vehicle is in the situation 2. | The self-vehicle is likely to be in a place where the weather condition of the surroundings is a dense fog. |
| | Acquire "dense fog information" | When the dense fog information | The self-vehicle is likely to be in a place where |

TABLE 1-continued

| Deceleration prohibition situation | Determination method used by the driving support ECU | Situation of the self-vehicle |
|---|---|---|
| from the navigation ECU or from an external communication ECU. | indicates that dense fog is occurring, the driving support ECU determines that the self-vehicle is in the situation 2. | the weather condition of the surroundings is a dense fog. |
| Situation 3 | Acquire a "road surface friction coefficient" from an external communication ECU. | When the "road surface friction coefficient" is smaller than a threshold friction coefficient, the driving support ECU determines that the self-vehicle is in the situation 3 | The road surface condition of the road on which the self-vehicle is traveling is a road surface condition having a low friction coefficient. |

It should be noted that an arbitrary value appropriate for the above determination is set as each of the threshold values (i.e., the threshold self-vehicle speed, the threshold target vehicle speed, the threshold another vehicle speed, the threshold speed limit, the threshold rainfall amount, and the threshold friction coefficient) in Table 1.

More specifically, based on the speed limit of a highway, a value in the vicinity of the speed limit of the highway may be set as the threshold target vehicle speed or the threshold another vehicle speed, that are used for the determination based on the "threshold self-vehicle speed", the "set vehicle speed of ACC", the "speed of the peripheral vehicle", or the "information on the speed limit". A value in the vicinity of the sensor value of the raindrop sensor 21 corresponding to "the rain with one hour rainfall of 10 mm or more" is set as the threshold rainfall amount used for the determination based on the "rainfall/raindrop amount." A value in the vicinity of the value based on a value that is generally regarded as a low road surface μ (for example, a road surface μ of a frozen road) is set as the threshold friction coefficient used for the determination based on the "road surface friction coefficient."

In a case where it is determined that the self-vehicle is in the deceleration prohibition situation, the deceleration of the self-vehicle with the constant deceleration is prohibited, the deceleration of the self-vehicle with the constant deceleration being the deceleration to be performed when it is determined that the driver is in the tentative abnormality state and when it is determined that the driver is in the conclusive abnormality state. Thereby, when the self-vehicle is in the deceleration prohibition situation, it is possible to reduce the possibility that the self-vehicle is automatically stopped and the possibility that the self-vehicle is made to travel at low speed.

On the other hand, in a case where it is determined that the self-vehicle is not in the deceleration prohibition situation, the self-vehicle is decelerated with the constant deceleration when it is determined that the driver is in the tentative abnormality state and when it is determined that the driver is in the conclusive abnormality state.

(Concrete Operation)

Next, the specific operation of the CPU (also simply referred to as "CPU") in the driving support ECU 10 will be described. The CPU is configured to perform each of routines shown by flowcharts in FIGS. 2 to 6 every time a predetermined period of time elapses.

The CPU monitors the state of the driver and determines which the driver is in, the "normal state", the "tentative abnormal state", or the "conclusive abnormal state" on the basis of the monitoring result. Thereafter, the CPU changes (sets) the values of a tentative abnormality flag Xk and a conclusive abnormality flag Xh according to the determined state.

The tentative abnormality flag Xk indicates that the present state of the driver is the "tentative abnormal state" when the value of the flag Xk is "1." The conclusive abnormality flag Xh indicates that the present state of the driver is the "conclusive abnormal state" when the value of the flag Xh is "1." When the tentative abnormality flag Xk and the conclusive abnormality flag Xh are both "0", the present state of the driver is the "normal state." The value of the tentative abnormality flag Xk and the value of the conclusive abnormality flag Xh are set to "0" in an initialization routine performed by the CPU when an ignition key switch (not shown) mounted on the self-vehicle is changed from an off-position to an on-position.

When the ignition key switch is in the on-position, the routines shown in FIGS. 2 to 6 are started/executed every time the predetermined period of time elapses. In this case, since the tentative abnormality flag Xk and the conclusive abnormality flag Xh are initialized (Xk=0, Xh=0), a normal state routine substantially functions.

Hereinafter, the normal state routine will be described, referring to FIG. 2. When a predetermined timing arrives, the CPU starts processing from step 200 of the normal state routine, and proceeds to step 210 to determine whether or not both of the value of the tentative abnormality flag Xk and the value of the conclusive abnormality flag Xh are "0."

Assuming that the present time point is a time point immediately after the ignition key switch is turned on. In this case, the tentative abnormality flag Xk and the conclusive abnormality flag Xh are initialized, and thus, both of the value of the tentative abnormality flag Xk and the value of the conclusive abnormality flag Xh are "0." Therefore, the CPU makes a "Yes" determination at step 210, and proceeds to step 220 to determine whether or not the vehicle speed SPD is higher than or equal to a tentative abnormality determination permission vehicle speed SPD0 which has been preset. It is should be noted that the tentative abnormality determination permission vehicle speed SPD0 is set at a value higher than or equal to a conclusive abnormality determination permission vehicle speed SPD1.

When the vehicle speed SPD is less than the tentative abnormality determination permission vehicle speed SPD0, the CPU makes a "No" determination at step 220 and proceeds to step 225 to set the value of a tentative abnormality determination timer t1 to "0" (cleared). Thereafter, the CPU proceeds to step 295 to tentatively terminate the present routine. In contrast, when the vehicle speed SPD is higher than or equal to the tentative abnormality determination permission vehicle speed SPD0, the CPU makes a "Yes" determination at step 220, and proceeds to step 230 to determine whether or not the driver is in a state (no driving operation state) in which the driver is not performing the driving operation. It is should be noted that the no driving operation state is the state in which none of the conditions 1 to 3 described above is satisfied.

When the driver is in the state in which the driver is performing the driving operation (that is, when any one of the conditions 1 to 3 described above is satisfied), the CPU makes a "No" determination at step 230 and proceeds to step 240 to set the value of the tentative abnormality determination timer t1 to "0." Thereafter, the CPU proceeds to step 295 to tentatively terminate the present routine. In contrast, when the driver is in the state in which the driver is not performing the driving operation, the CPU makes a "Yes" determination at step 230 and proceeds to step 250 to increase the value of the tentative abnormality determination timer t1 by "1." The value of the tentative abnormality determination timer t1 represents the time in which no driving operation state continues when the vehicle speed SPD is higher than or equal to the tentative abnormality determination permission vehicle speed SPD0.

Thereafter, the CPU proceeds to step 260 to determine whether or not the tentative abnormality determination timer t1 is greater than or equal to the tentative abnormality confirmation time t1ref which has been preset. For example, the tentative abnormality confirmation time t1ref is set at an appropriate time between 5 seconds and 30 seconds.

When the tentative abnormality determination timer t1 is less than the tentative abnormality confirmation time t1ref, the CPU makes a "No" determination at step 260 and proceeds to step 295 to tentatively terminate the present routine. In contrast, when the tentative abnormality determination timer t1 is greater than or equal to the tentative abnormality confirmation time t1ref, the CPU makes a "Yes" determination at step 260 and proceeds to step 270 to set the value of the tentative abnormality flag Xk to "1." Thereafter, the CPU proceeds to step 295 to tentatively terminate the present routine.

If the state of the driver is the normal state, it is unlikely that the no driving operation state continues over the tentative abnormality confirmation time t1ref while the vehicle speed SPD is higher than or equal to the tentative abnormality determination permission vehicle speed SPD0. Therefore, when the no driving operation state continues over the tentative abnormality confirmation time t1ref while the vehicle speed SPD is equal to or higher than the tentative abnormality determination permission vehicle speed SPD0, the CPU determines that it is likely that the state of the driver is the abnormal state (that is, the driver is in the tentative abnormal state), by the process described above.

The time point at which the value of the tentative abnormality flag Xk has been set to "1" is a time point at which the driving support ECU 10 has determined at the first time that the driver is in the abnormal state where the driver loses the ability to drive the vehicle (It has tentatively determined that the driver is in the abnormal state). When the tentative abnormality flag Xk is set to "1", the CPU makes a "No" determination at step 210 and proceeds to step 295 via step 225. Therefore, the normal state routine of FIG. 2 is not substantially performed, and the conclusive abnormality determination routine which will be described later functions.

It is should be noted that when the tentative abnormality flag Xk is set at "1" or when the conclusive abnormality flag Xh is set at "1", the driving support ECU 10 automatically performs the traffic lane keeping control (LKA). That is, even when the execution of the traffic lane keeping control is not selected by the operation switch 18, the traffic lane keeping control is forcibly performed. Therefore, even if the driver is not performing the steering operation, the self-vehicle can travel along the target traveling line (the center position of the left and right white lines).

Furthermore, when the tentative abnormality flag Xk is set at "1" or when the conclusive abnormality flag Xh is set at "1", the driving support ECU 10 stops/terminates the trailing Inter-vehicle distance Control (ACC) even if the execution of the trailing Inter-vehicle distance Control (ACC) is selected by the operation switch 18. However, when the inter-vehicle distance between the self-vehicle and a preceding vehicle traveling in front of the self-vehicle may become less than an allowable distance regardless of the selection of the ACC, the driving support ECU 10 controls the deceleration of the self-vehicle so that the inter-vehicle distance does not become shorter than an allowable distance.

Figure 3:
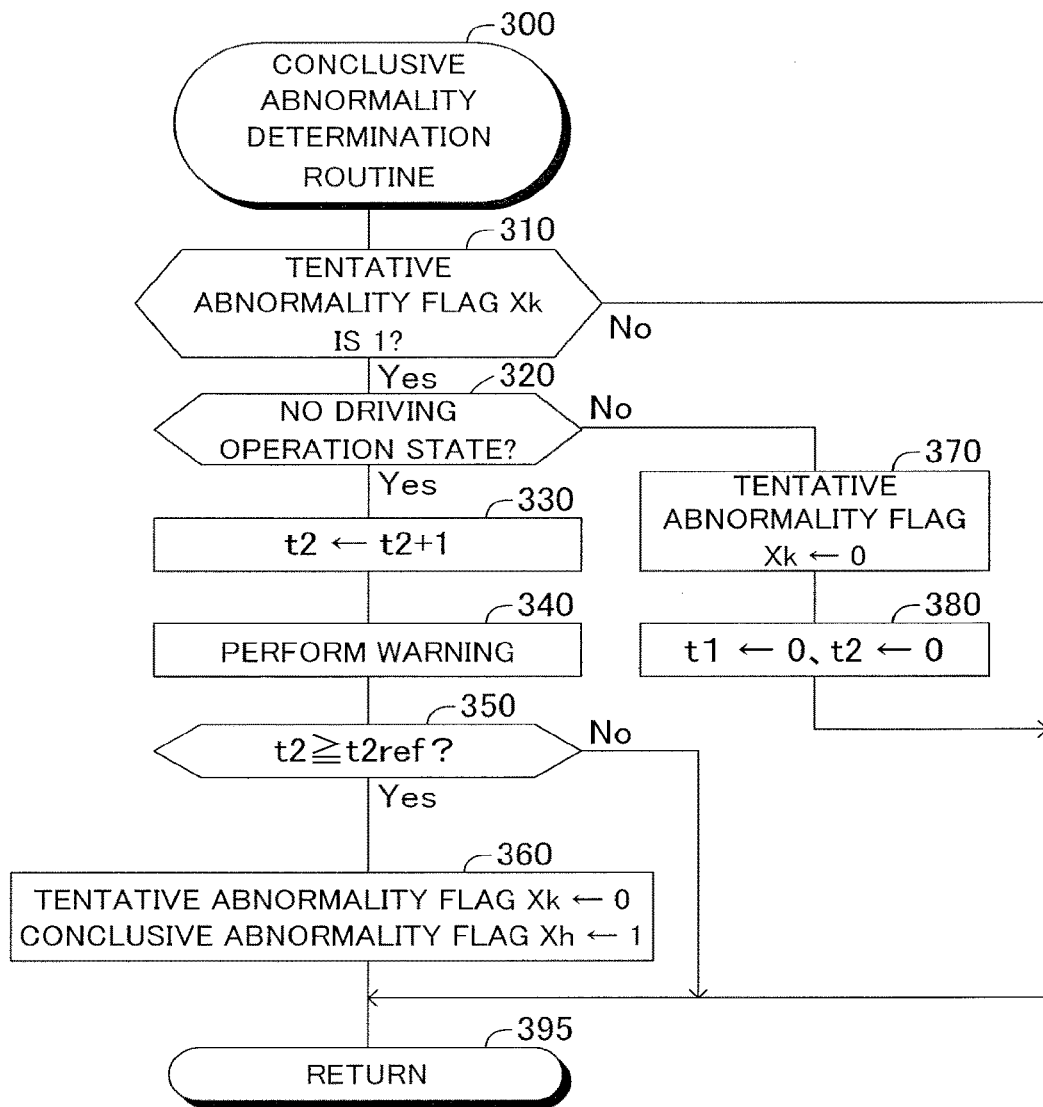
FIG. 3 is a flowchart showing a conclusive abnormality determination routine performed by the CPU of the driving support ECU illustrated in FIG. 1.

Next, the conclusive abnormality determination routine will be described, referring to FIG. 3. When a predetermined timing arrives, the CPU starts processing from step 300 in FIG. 3, and proceeds to step 310 to determine whether or not the value of the tentative abnormality flag Xk is "1."

When the value of the tentative abnormality flag Xk is "0", the CPU makes a "No" determination at step 310 and proceeds to step 395 to tentatively terminate the present routine.

In contrast, when the value of the tentative abnormality flag Xk is "1", the CPU makes a "Yes" determination at step 310 and proceeds to step 320 to determine whether or not the driver is in the no driving operation state.

When the driver is in a state in which the driver is performing the driving operation, the CPU makes a "No" determination at step 320 and proceeds to step 370 to set the value of the tentative abnormality flag Xk to "0." Thereafter, the CPU proceeds to step 380 to set both the value of the tentative abnormality determination timer t1 and the value of the conclusive abnormality determination timer t2 to "0." Thereafter, the CPU proceeds to step 395 to tentatively terminate the present routine.

In contrast, when the driver is in the no driving operation state, the CPU makes a "Yes" determination at step 320 and proceeds to step 330 to increase the value of the conclusive abnormality determination timer t2 by "1." Thereafter, the CPU proceeds to step 340 to perform the warning to the driver, and proceeds to step 350 to determine whether or not the conclusive abnormality determination timer t2 is greater than or equal to the conclusive abnormality confirmation time t2ref which has been preset. It should be noted that, for example, the conclusive abnormality confirmation time t2ref is set to an appropriate time between 20 seconds and 30 seconds.

When the conclusive abnormality determination timer t2 is less than the conclusive abnormality confirmation time t2ref, the CPU makes a "No" determination at step 350 and proceeds to step 395 to tentatively terminate the present routine. In contrast, when the conclusive abnormality determination timer t2 is greater than or equal to the conclusive abnormality confirmation time t2ref, the CPU makes a "Yes" determination at step 350 and proceeds to step 360 to set the value of the tentative abnormality flag Xk to "0" and set the value of the conclusive abnormality flag Xh to "1." Thereafter, the CPU proceeds to step 395 to tentatively terminate the present routine.

If the state of the driver is the normal state, owing to the warning described above, it is unlikely that the no driving operation state continues over the conclusive abnormality confirmation time t2ref. Therefore, when the no driving operation state continues over the conclusive abnormality confirmation time t2ref, the CPU determines that the state of the driver is the abnormal state (that is, the driver is in the conclusive abnormal state), by the process described above.

Figure 4:
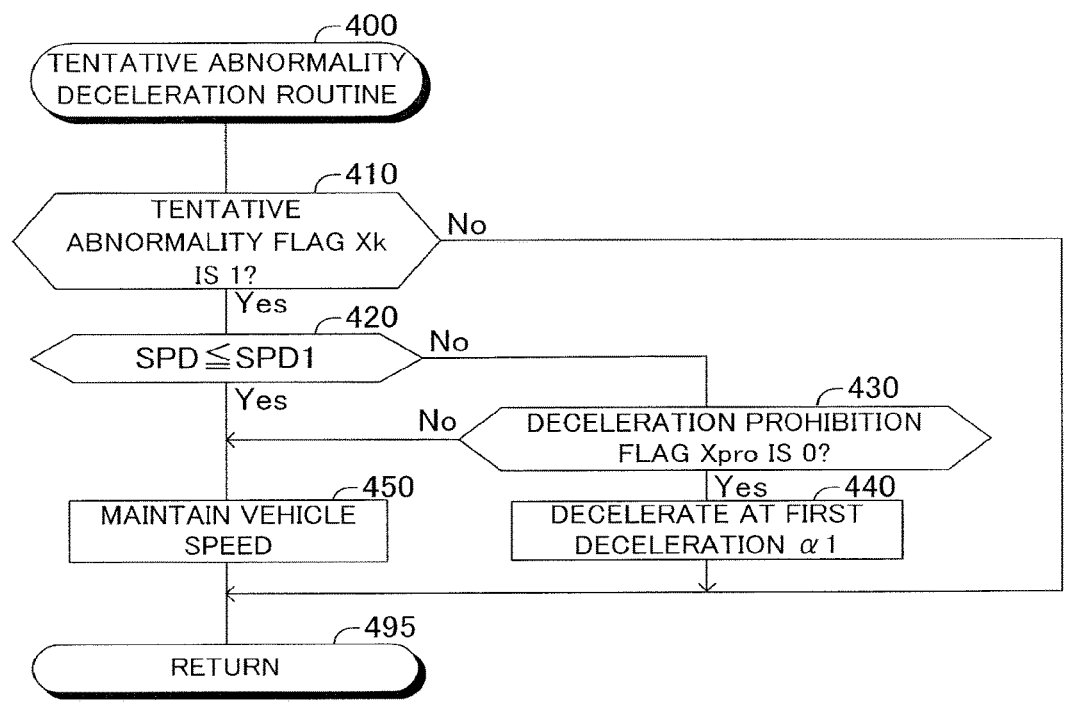
FIG. 4 is a flowchart showing a tentative abnormality deceleration routine performed by the CPU of the driving support ECU illustrated in FIG. 1.

Next, the tentative abnormality deceleration routine will be described, referring to FIG. 4. When a predetermined timing arrives, the CPU starts processing from step 400 in FIG. 4, and proceeds to step 410 to determine whether or not the value of the tentative abnormality flag Xk is "1."

When the value of the tentative abnormality flag Xk is not "1", the CPU makes a "No" determination at step 410 and proceeds to step 495 to tentatively terminate the present routine. In contrast, when the value of the tentative abnormality flag Xk is "1", the CPU makes a "Yes" determination at step 410 and proceeds to step 420 to determine whether or not the vehicle speed SPD becomes equal to or lower than the conclusive abnormality determination permission vehicle speed SPD1 which has been preset. It is should be noted that the conclusive abnormality determination permission vehicle speed SPD1 is a lower limit value of the vehicle speed (which is permitted) while the state of the driver is determined to be in the tentative abnormality state, and is set to a value higher than zero.

When the vehicle speed SPD is higher than the conclusive abnormality determination permission vehicle speed SPD1, the CPU makes a "No" determination at step 420, and proceeds to step 430 to determine whether or not a value of a deceleration prohibition flag Xpro is "0." The value of the deceleration prohibition flag Xpro is set to "0" in the initialization routine described above, and is set to "0" when it is determined that the self-vehicle is in a situation where the self-vehicle is permitted/allowed to decelerate (that is, when the self-vehicle is not in the deceleration prohibition situation). Further, the value of the deceleration prohibition flag Xpro is set to "1" when it is determined that the self-vehicle is in a state where the self-vehicle should not be decelerated (that is, when the self-vehicle is in the deceleration prohibition situation). The method of setting the deceleration prohibition flag Xpro (that is, the method of determining whether or not the self-vehicle is in the situation where the self-vehicle is permitted to decelerate) will be described later referring to FIG. 6.

When the value of the deceleration prohibition flag Xpro is "0", the CPU makes a "Yes" determination at step 430 and proceeds to step 440 to decelerate the self-vehicle at/with the first deceleration α1. Thereafter, the CPU proceeds to step 495 to tentatively terminate the present routine.

When the value of the deceleration prohibition flag Xpro is not "0" (that is, the value of the deceleration prohibition flag Xpro is "1"), the CPU makes a "No" determination at step 430 and proceeds to step 450 to maintain the vehicle speed of the self-vehicle at the present vehicle speed. Thereafter, the CPU proceeds to step 495 to terminate the present routine.

In contrast, when the vehicle speed SPD is lower than or equal to the conclusive abnormality determination permission vehicle speed SPD1, the CPU makes a "Yes" determination at step 420 and proceeds to step 450 to maintain the vehicle speed of the self-vehicle at the present vehicle speed, and proceeds to step 495 to terminate the present routine. In this case, the driving support ECU 10 outputs a command signal for causing the self-vehicle to travel at a constant speed equal to the present vehicle speed SPD acquired based on the signal from the vehicle speed sensor 16, to the engine ECU 30 and the brake ECU. As a result, the traveling state of the self-vehicle is switched from the deceleration traveling until that time point to the constant speed traveling. It is should be noted that if the constant speed traveling is continued, the driving support ECU 10 may store the vehicle speed at the time of switching from the deceleration traveling to the constant speed traveling, and maintain the vehicle speed of the self-vehicle at the stored vehicle speed. Thereafter, the CPU proceeds to step 495 to tentatively terminate the present routine.

Owing to those processes described above repeatedly executed by the CPU, when the CPU determines that the self-vehicle is in the deceleration prohibition state, the CPU prohibits the deceleration traveling at/with the constant deceleration which is to be performed when the CPU determines that the driver is in the tentative abnormal state and determines that the vehicle speed SPD is greater than the conclusive abnormality determination permission vehicle speed SPD1. Thereby, it is possible to reduce the possibility that the self-vehicle is automatically stopped when the self-vehicle is in the situation in which it is not preferable that the self-vehicle be stopped, and to reduce the possibility that the self-vehicle is traveled at low speed in the same situation as above.

Figure 5:
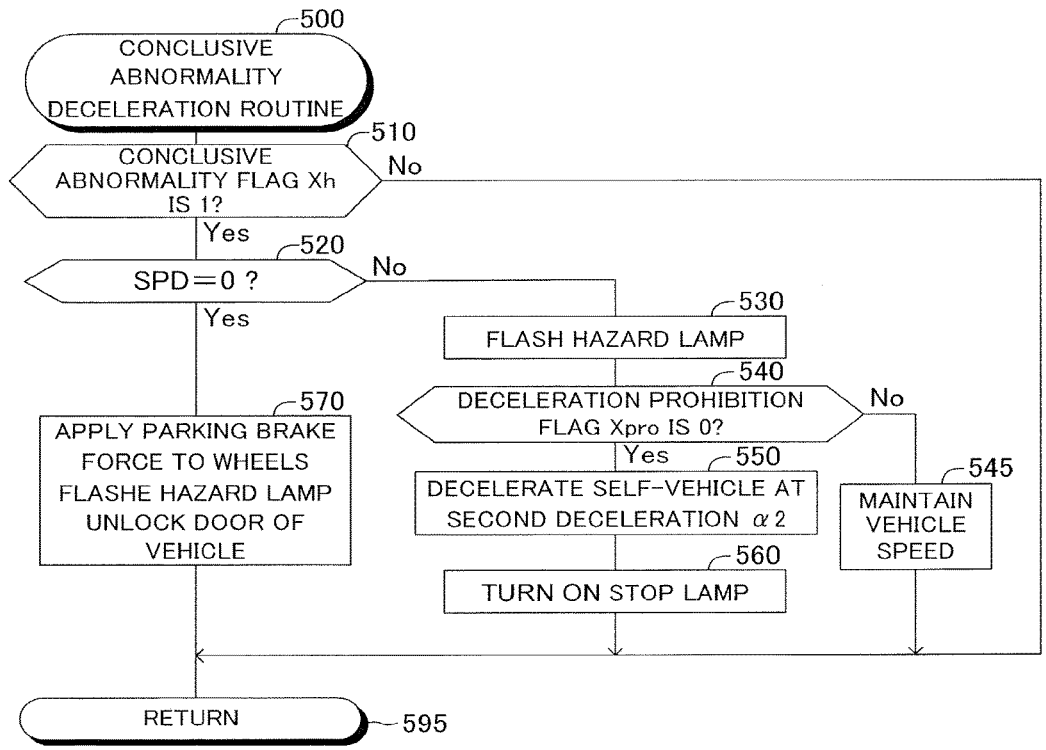
FIG. 5 is a flowchart showing a conclusive abnormality deceleration routine performed by the CPU of the driving support ECU illustrated in FIG. 1.

Next, the conclusive abnormality deceleration routine will be described, referring to FIG. 5. When a predetermined timing arrives, the CPU starts processing from step 500 in FIG. 5, and proceeds to step 510 to determine whether or not the value of the conclusive abnormality flag Xh is "1."

When the value of the conclusive abnormality flag Xh is not "1", the CPU makes a "No" determination at step 510 and proceeds to step 595 to tentatively terminate the present routine. In contrast, when the value of the conclusive abnormality flag Xh is "1", the CPU makes a "Yes" determination at step 510 and proceeds to step 520 to determine whether or not the self-vehicle has stopped based on the vehicle speed SPD. More specifically, the CPU determines whether or not the vehicle speed SPD is 0 at step 520.

When this determination is made for the first time, the self-vehicle is not stopped. In this case, since the vehicle speed SPD is not 0, the CPU makes a "No" determination at step 520 and proceeds to step 530 to output a flashing instruction of the hazard lamp 71.

Next, the CPU proceeds to step 540 to determine whether or not the deceleration is permitted. Specifically, the CPU determines whether or not the value of the deceleration prohibition flag Xpro is "0" at step 540.

When the value of the deceleration prohibition flag Xpro is "0", the CPU makes a "Yes" determination at step 540 and proceeds to step 550 to decelerate the self-vehicle at/with a second deceleration α2 which has been preset. The second deceleration α2 is set to a value having a larger absolute value than an absolute value of the first deceleration α1.

Next, the CPU proceeds to step 560 and outputs a lighting command of the stop lamp 72 to the meter ECU 70. In this way, the stop lamp 72 is turned on, and the hazard lamp 71 is blinked, so that attention can be given to the driver of the following vehicle. Thereafter, the CPU proceeds to step 595 to tentatively terminate the present routine.

In contrast, when the value of the deceleration prohibition flag Xpro is "1" (that is, when the deceleration of the self-vehicle is prohibited) at the time point at which the CPU performs the process of step 540, the CPU makes a "No" determination at step 540 and proceeds to step 545 to maintain the vehicle speed of the self-vehicle at the present vehicle speed (that is, the CPU prohibits the deceleration of the self-vehicle), and then proceeds to step 595 to tentatively terminate the present routine. Therefore, in this case, since the vehicle is not decelerated, the vehicle does not stop.

Meanwhile, when the vehicle speed SPD is 0 at the above-described step 520, the CPU makes a "Yes" determination at step 520, and proceeds to step 570 to apply the parking brake force to the wheels using the electric parking brake ECU 50. That is, the driving support ECU 10 maintains the self-vehicle at a stopped state. Further, the CPU flashes the hazard lamp 71 using the meter ECU 70, and unlocks doors of the vehicle using a door lock ECU (not shown). Thereafter, the CPU proceeds to step 595 to tentatively terminate the present routine.

Figure 6:
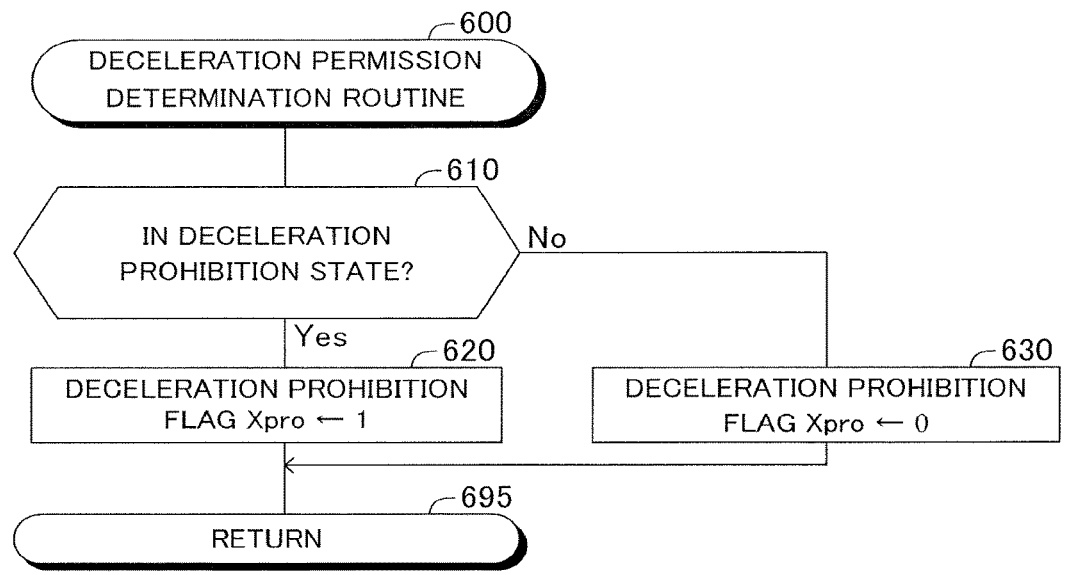
FIG. 6 is a flowchart showing a deceleration permission determination routine performed by the CPU of the driving support ECU illustrated in FIG. 1.

Next, a deceleration permission determination routine will be described, referring to FIG. 6. When a predetermined timing arrives, the CPU starts processing from step 600 in FIG. 6, and proceeds to step 610 to determine whether or not the self-vehicle is in the deceleration prohibition state. This determination is made according to the methods shown in Table 1 already described. That is, the CPU determines whether or not the self-vehicle is in the deceleration prohibition state by determining whether or not the self-vehicle is in at least one of the situations 1, 2, and 3, according to the methods described in Table 1.

When it is determined that the self-vehicle is in the deceleration prohibition state, the CPU makes a "Yes" determination at step 610, and proceeds to step 620 to set the value of the deceleration prohibition flag Xpro to "1." Thereafter, the CPU proceeds to step 695 to tentatively terminate the present routine.

In contrast, when it is determined that the self-vehicle is not in the deceleration prohibition state, the CPU makes a "No" determination at step 610, and proceeds to step 630 to set the value of the deceleration prohibition flag Xpro to "0." Thereafter, the CPU proceeds to step 695 to tentatively terminate the present routine.

According to the vehicle traveling control apparatus according to the embodiment of the present invention, effects described below can be acquired. That is, according to the conventional apparatus, the place where the automatic stop of the vehicle is permitted is not specifically determined/specified. Therefore, even when the self-vehicle is in the situation which is not suitable/favorable for automatically stopping the self-vehicle, the self-vehicle is likely to be automatically stopped or likely to be made to travel at a low speed.

In contrast, according to the vehicle traveling control apparatus according to the embodiment of the present invention, when the self-vehicle is in the deceleration prohibition state, the deceleration of the self-vehicle is prohibited. Thereby, when the self-vehicle is in the situation which is not suitable/favorable for automatically stopping the self-vehicle, it is possible to reduce the possibility that the self-vehicle is automatically stopped or the possibility that the self-vehicle is traveled at a low speed.

<Modified Examples>

Although the embodiment of the present invention has been specifically described above, the present invention is not limited to the above embodiment, and various modified examples based on the technical idea within the scope of the present invention can be adopted.

For example, in the present embodiment, the stereo camera is used as the camera apparatus 17b, but a monocular camera or the like may be used.

For example, in the present embodiment, the deceleration prohibition situation determined based on at least one of the vehicle speed situation/condition of another vehicle traveling around the self-vehicle, the weather situation/condition around the self-vehicle, and the road surface situation/condition around the self-vehicle is not limited to the example described above.

For example, in the present embodiment, the method of determining whether or not the self-vehicle is in the "deceleration prohibition situation" (that is, whether or not the self-vehicle is in at least one of the situations 1 to 3) is not limited to the methods shown in Table 1. For example, the road surface friction coefficient of the road on which the self-vehicle is traveling may be acquired based on image data captured by the image capturing apparatus (camera apparatus 17b). Alternatively, an estimated road surface friction coefficient of the road on which the self-vehicle is traveling is acquired by an ABS (Anti-lock Brake System) or a VSC (Vehicle Stability Control), and the estimated road surface friction coefficient of the road may be used as the road surface friction coefficient of the road on which the self-vehicle is traveling. Further, the road surface friction coefficient of the road on which the self-vehicle is traveling may be acquired through a communication between the wireless communication device 111 and a roadside apparatus such as "ITS spot" or the like.

Furthermore, for example, the driving support ECU 10 may determine whether or not a wiper switch (not shown) provided to the self-vehicle is in an ON state (ON state or OFF state), and when it is determined that the wiper switch is in the ON state, the driving support ECU 10 may determine that the self-vehicle is in the situation 2. In addition, for example, the driving support ECU 10 may determine what the weather situation/condition is based on the weather information acquired by the wireless communication device 111 communicating with an external network system or the like. Then/Thereafter, the driving support ECU 10 may determine that the self-vehicle is in the situation 2 when the weather condition/situation is a predetermined condition (specifically, rainfall, dense fog, or the like).

The embodiment performs the abnormal determination of the driver based on the time (duration) for which the non-driving-operation state is continuing, however, in place of that, the embodiment may be configured to perform the abnormal determination of the driver by utilizing so-called "driver monitoring technique", described in Japanese Laid Open Publication No. 2013-152700, for example. Specifically, a camera for taking an image of the driver of the self-vehicle is provided on a member (for example, the steering wheel, a pillar, or the like) inside the self-vehicle. The driving support ECU 10 may monitor a direction of a line of sight of the driver or a direction of the driver's face using the image taken by the camera. The driving support ECU 10 may determine that the driver is in the tentative abnormal state when the direction of the line of the sight of the driver or the direction of the driver's face continues to be a direction with which the line of the sight of the driver or the direction of the driver's face does not coincide while the driver drives the self-vehicle normally, for the tentative abnormality confirmation time t1ref or more. Furthermore, after the tentative abnormality determination is made, when the direction of the line of the sight of the driver or the direction of the driver's face continues to be the direction with which the line of the sight of the driver or the direction of the driver's face does not coincide while the driver drives the self-vehicle normally, for the conclusive abnormality confirmation time t2ref or more, the driving support ECU 10 may determine that the driver is in the conclusive abnormal state.

For example, the abnormality determination of the driver may be made using the confirmation button 20. More specifically, the driving support ECU 10 may prompt/urge the driver of the self-vehicle to operate the confirmation button 20 with a display image and/or a voice message every time a first time elapses, and may determine that the driver is in the tentative abnormal state when a state where no operation of the confirmation button 20 is made continues for the tentative abnormality determination time t1ref or more. The determination time t1ref is longer than the first time. Further, after it is determined that the driver is in the tentative abnormal state, the driving support ECU 10 may prompt/urge the driver of the self-vehicle to operate the confirmation button 20 with a display image and/or a voice message every time the first time elapses, and may determine that the driver is in the conclusive abnormal state when the state where no operation of the confirmation button 20 is made continues for the conclusive abnormality determination time t2ref or more. The determination time t2ref is longer than the first time.

Such an abnormality determination using the image of the driver or the confirmation button 20 can be used for a determination (at least one of step 230 and step 320) as to whether or not the driver is in the state in which the driver is not performing the driving operation.

Figure 2:
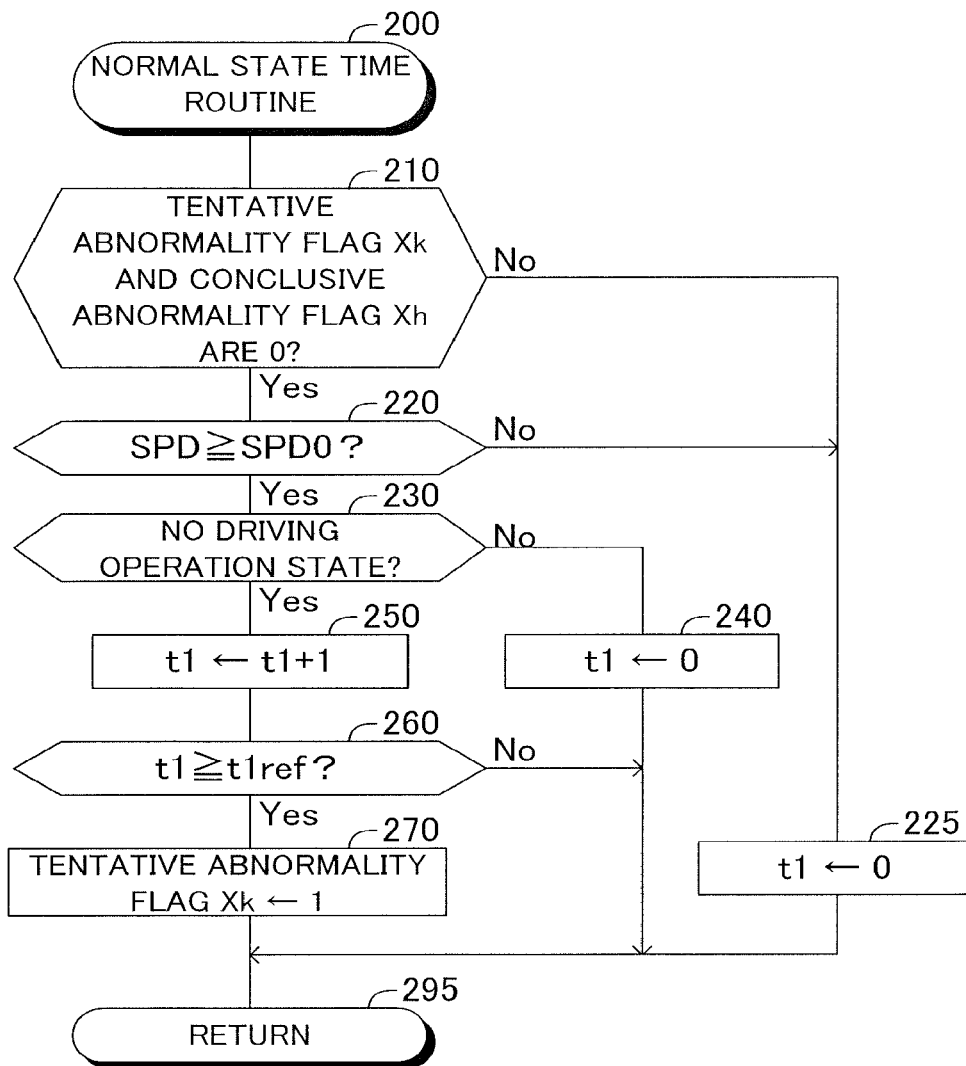
FIG. 2 is a flowchart showing a normal state routine performed by a CPU of the driving support ECU illustrated in FIG. 1.

Furthermore, in the normal state routine shown in FIG. 2, the program may be configured to permit the tentative abnormality determination to be conducted only when the LKA is being performed, or only when both of the LKA and the ACC are being performed. That is, the normal state routine may be changed as follows. A step for determining "whether or not the LKA is being performed" or "whether or not both of the LKA and the ACC are being performed" is added between step 200 and step 210. When the CPU makes a "Yes" determination at the added step, it proceeds to step 210. In contrast, when the CPU makes a "No" determination at the added step, it proceeds to step 225.

What is claimed is:

1. A vehicle traveling control apparatus applied to a vehicle comprising:
    circuitry configured to
    monitor whether or not a driver of said vehicle is in an abnormal state where said driver loses an ability to drive said vehicle;
    decelerate said vehicle to automatically stop said vehicle after a conclusive abnormality determination time point which is a time point when said circuitry finalizes a determination that said driver is in said abnormal state;
    determine whether or not said vehicle is in a deceleration prohibition situation based on at least one set of self-vehicle information on a traveling state of said vehicle, information on a vehicle speed of another vehicle traveling around said vehicle, information on a speed limit of a road on which said vehicle is traveling, information on weather condition around said vehicle, and information on a road surface condition of said road on which said vehicle is traveling; and
    prohibit said deceleration of said vehicle when it is determined that said vehicle is in said deceleration prohibition situation.

2. The vehicle traveling control apparatus according to claim 1, wherein said circuitry is configured to:
    start said deceleration of said vehicle from a tentative abnormal determination time point which is a time point at which it is determined that said driver is likely to be in said abnormal state by said circuitry and which is prior to said conclusive abnormal determination time point; and
    prohibit said deceleration of said vehicle when it is determined that said vehicle is in said deceleration prohibition situation in a period after said tentative abnormality determination time point.

3. The vehicle traveling control apparatus according to claim 1, wherein said circuitry is configured to:
    acquire a vehicle speed of said vehicle as said self-vehicle information; and
    determine whether or not said vehicle speed acquired as said self-vehicle information is higher than a threshold self-vehicle speed to determine whether or not said vehicle is in said deceleration prohibition situation.

4. The vehicle traveling control apparatus according to claim 1, wherein said vehicle is provided with a cruise control apparatus which controls a vehicle speed of said vehicle in such a manner that a vehicle speed of said vehicle becomes equal to a target vehicle speed set by said driver, and
    wherein said circuitry is configured to acquire said vehicle speed of said vehicle and said target vehicle speed which has been set most recently as said self-vehicle information, and to determine whether or not said vehicle speed of said vehicle is higher than said target vehicle speed which has been set most recently, to determine whether or not said vehicle is in said deceleration prohibition situation.

5. The vehicle traveling control apparatus according to claim 1, wherein said circuitry is configured to determine whether or not said vehicle speed of another vehicle is higher than a threshold another vehicle speed to determine whether or not said vehicle is in said deceleration prohibition situation.

6. The vehicle traveling control apparatus according to claim 1, wherein said vehicle is provided with a cruise control apparatus which controls a vehicle speed of said vehicle in such a manner that said vehicle speed of said vehicle becomes equal to a target vehicle speed set by said driver, and
    wherein said circuitry is configured to acquire said target vehicle speed as said information on said speed limit, and to determine whether or not said target vehicle speed is higher than a threshold target vehicle speed, to determine whether or not said vehicle is in said deceleration prohibition situation.

7. The vehicle traveling control apparatus according to claim 1, wherein said vehicle is provided with a navigation device having information on said speed limit of said road on which said vehicle is traveling, and
    wherein said circuitry is configured to acquire said speed limit as said information on said speed limit from said navigation device, and to determine whether or not said acquired speed limit is higher than a threshold speed limit, to determine whether or not said vehicle is in said deceleration prohibition situation.

8. The vehicle traveling control apparatus according to claim 1, wherein said vehicle is provided with a communication device configured to be capable of receiving information on said speed limit of said road on which said vehicle is traveling from an external device of said vehicle, and
    wherein said circuitry is configured to acquire said speed limit as said information on said speed limit from said communication device, and to determine whether or not said acquired speed limit is higher than a threshold speed limit, to determine whether or not said vehicle is in said deceleration prohibition situation.

9. The vehicle traveling control apparatus according to claim 1, wherein said vehicle is provided with an imaging device which acquires image data by photographing a peripheral region of said vehicle, and
    wherein said circuitry is configured to extract said speed limit indicated by a road sign included in said image data as said information on said speed limit, and to determine whether or not said extracted speed limit is higher than a threshold speed limit, to determine whether or not said vehicle is in said deceleration prohibition situation.

10. The vehicle traveling control apparatus according to claim 1, wherein said vehicle is provided with a rainfall information acquiring device which acquires rainfall information indicating whether or not the weather condition around said vehicle is rainy, and wherein said circuitry is configured to determine whether or not said weather condition around said vehicle is rainy based on said rainfall information, to determine whether or not said vehicle is in said deceleration prohibition situation.

11. The vehicle traveling control apparatus according to claim 1, wherein said vehicle is provided with a dense fog information acquiring device which acquires dense fog information indicating whether or not the weather condition around said vehicle is densely foggy, and wherein said circuitry is configured to determine whether or not said weather condition around said vehicle is densely foggy based on said dense fog information, to determine whether or not said vehicle is in said deceleration prohibition situation.

12. The vehicle traveling control apparatus according to claim 1, wherein said vehicle is provided with a road surface μ acquiring device which acquires a road surface friction coefficient of said road on which said vehicle is traveling, and wherein said circuitry is configured to acquire said road surface friction coefficient as said information on said road surface condition of said road on which said vehicle is traveling from road surface μ acquiring device, and to determine whether or not said road surface friction coefficient is smaller than a threshold road surface friction coefficient, to determine whether or not said vehicle is in said deceleration prohibition situation.

* * * * *